United States Patent [19]
Minifie et al.

[11] 4,086,371
[45] Apr. 25, 1978

[54] METHOD FOR MANUFACTURING CRYSTALLINE CONFECTIONERY FOOD PRODUCTS

[75] Inventors: Bernard W. Minifie, Bristol, England; Ted S. Czyzewski, Bloomingdale, Ill.

[73] Assignee: Dover Corporation, New York, N.Y.

[21] Appl. No.: 660,846

[22] Filed: Feb. 24, 1976

[51] Int. Cl.² .......................... A23G 3/00; A23G 1/00
[52] U.S. Cl. ...................................... 426/658; 426/660
[58] Field of Search ............... 426/660, 658, 659, 631, 426/584, 467, 471; 159/23

[56] References Cited
U.S. PATENT DOCUMENTS 3,356,045  12/1967  Karpenko et al. ................... 426/660
3,669,030  6/1972  Waters ................................. 426/660

Primary Examiner—Jeanette M. Hunter
Attorney, Agent, or Firm—Darbo & Vandenburgh

[57] ABSTRACT

A feed stock comprising sugar, milk solids, a significant amount of moisture, and in some instances chocolate, is raised to a temperature of about 125° C. and at the same time is condensed to have a moisture content of between about 4% and 6%. This is done by moving the material upwardly in an annular column and heating the walls defining that annular column. The condensed material is maintained at its final temperature and transferred to a crystallizer. In the crystallizer it is moved downwardly and kneaded. The kneading is performed by two sets of interdigitating rods, one set being stationary and the other set moving transversely to the downward path of movement of the material. As it is being kneaded it is cooled, both by contact with refrigerated surfaces and also by a countercurrent flow of cool air. The kneading is continued until the product is crystallized and particulate. Thereafter, it is optionally dried to a moisture content of about 1%.

8 Claims, 4 Drawing Figures

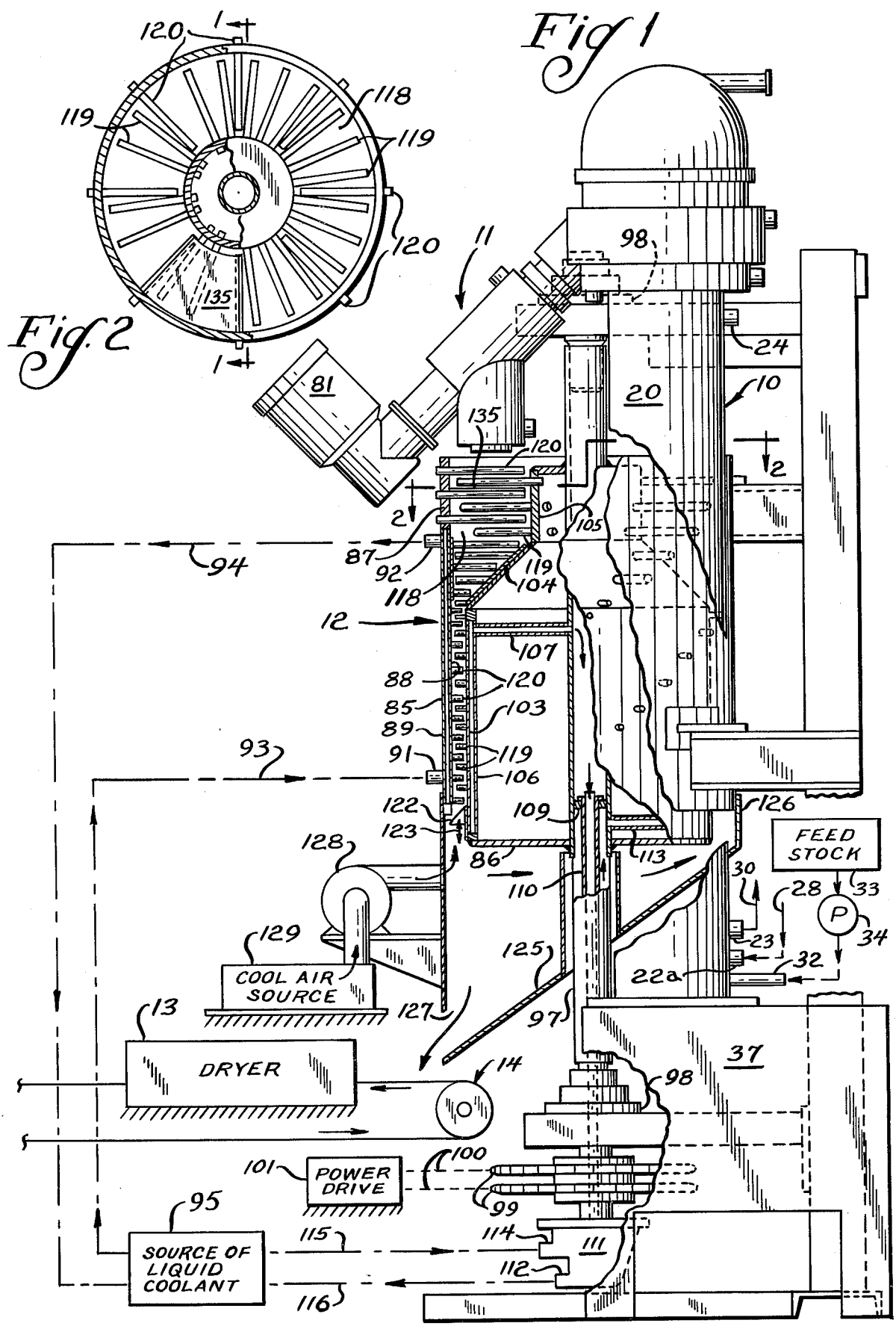

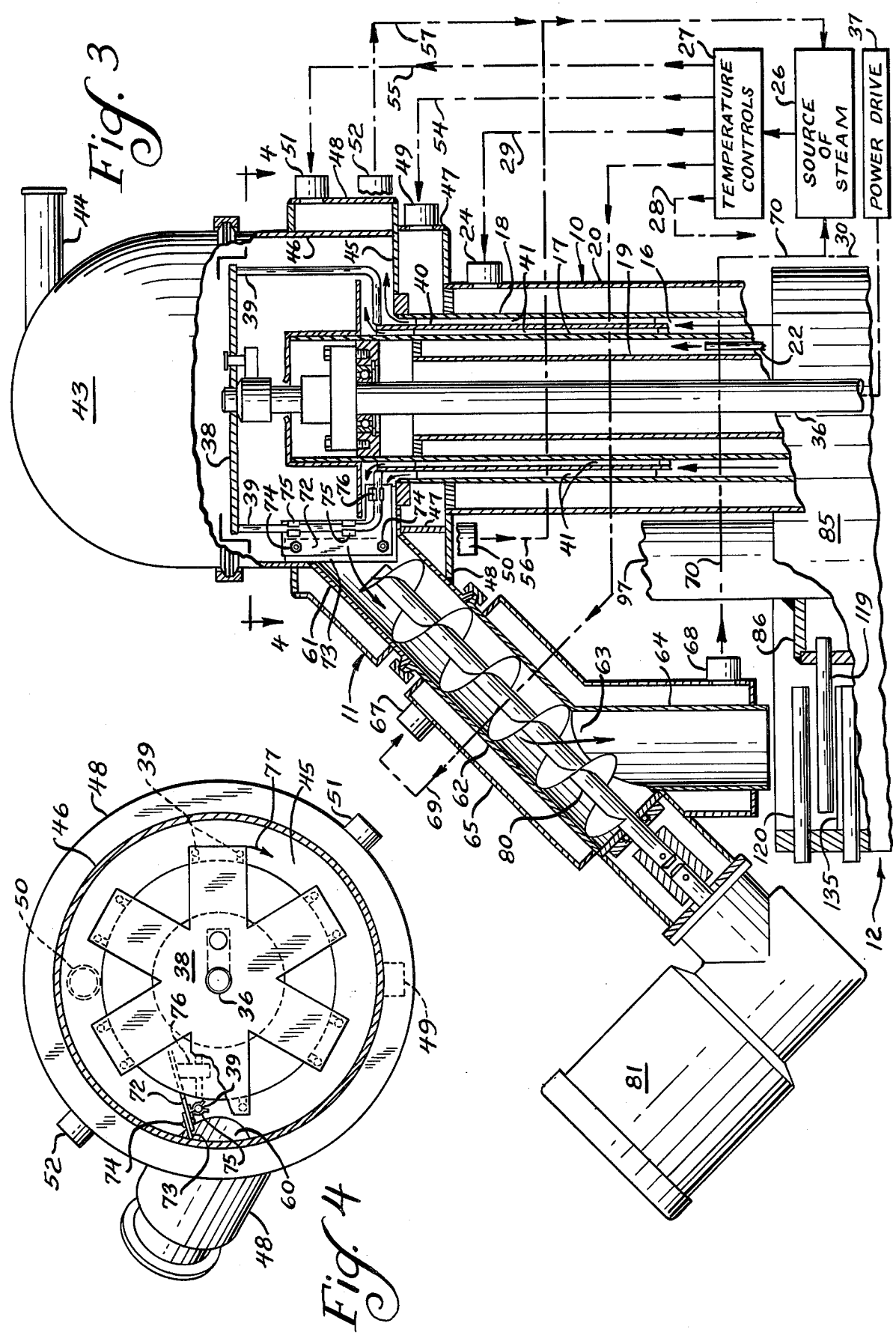

METHOD FOR MANUFACTURING CRYSTALLINE CONFECTIONERY FOOD PRODUCTS

BACKGROUND AND SUMMARY OF THE INVENTION

The present invention is primarily concerned with the crumb process of manufacturing milk chocolate, although the concepts involved can be utilized in the manufacture of other products which are to be crystallized from a material which is viscous and sticky and for the condensing of a feed stock which becomes viscous and sticky when in its condensed state. The present commercial process of producing milk crumb is described in the book *Chocolate, Cocoa and Confectionary: Science and Technology*, Bernard W. Minifie, published by The AVI Publishing Company, Inc. (1970), particularly pages 91-93. To summarize, the milk is first evaporated at a temperature of 75° C. to about 30-40% solids in a continuous evaporator. Sugar is added and the milk/sugar mixture is condensed in pans under vacuum at a temperature of about 75° C. to about 90° solids. Chocolate (the term is used herein to include cocoa) liquor is put in heavy mixing equipment, such as a melangeur, and while that equipment is operating a batch of that condensed milk/sugar is gradually run in and kneaded by the equipment. This produces a batch of stiff magma which is placed in shallow trays and vacuum dried at a temperature of 75° - 105° C. This generally is a batch operation although some efforts have been made to use a continuous process.

The present invention is a continuous process wherein all of the ingredients, including the chocolate (which is optional depending upon the desired final product), are initially mixed together to form a liquid feed stock. Essentially the feed stock comprises sugar, milk solids and a substantial amount of moisture (e.g., 28-30% by weight). This feed stock is evaporated in a continuous evaporator to produce a condensed mixture having about 4-6% moisture (by weight) and a temperature of about 121.1° C. (250° F.) to about 126.67° C. (260° F.). The material at this stage is viscous, sticky and ready to crystallize. It has the consistency of a paste (e.g., toothpaste). It is then promptly kneaded and cooled in a continuous operation during which it crystallizes in the form of small particles.

The condensation is performed in a vertical evaporator having an annular, narrow process passageway, both walls of which are heated and scraped. Upon reaching the top of that passageway the material is mechanically moved to the crystallizer and care is taken to maintain the material temperature at about the same as that when it came from the process passageway. The crystallizer also has an annular vertical passageway through which the material moves in the downward direction. This passageway decreases in cross-sectional area between its uppermost and lowermost portions. One of the annular walls that defines this passageway rotates with respect to the other. Both walls carry a plurality of mixing elements that project horizontally into the passageway, with the elements interdigitating in the vertical direction. These perform the kneading operation which is a pulling, stretching and working of the condensed material.

The method and apparatus of the present invention have numerous significant advantages over the present commercial practice. Among these are: based on an equivalent daily production rate, the cost of the apparatus utilizing the present invention is only a fraction of that required for the conventional batch process. Similarly, the required factory space is greatly reduced by the present invention. The present invention does not require that most of the operations be conducted under a vacuum as do the present commercial processes, although a vacuum could be used in the evaporator of the present invention if desired. An increase in uniformity of resulting crumb is achieved. The process in accordance with the present invention is more readily adaptable to a variety of conditions than is the case with conventional operations and thus provides substantial flexibility. The operator can readily produce different products at different times using the same apparatus.

In the manufacture of milk (or chocolate) crumb an important feature is the reaction of the sugar and milk solids during evaporation to produce caramelization. This reaction is an important factor in the flavor of the resulting product. Various manufacturers have different aims as to the flavor to be achieved. Through the use of the present process and apparatus, a manufacturer will have little difficulty in consistently obtaining just the flavor he desires.

In the manufacture of crumb, it is important to form small size sugar crystals. Large crystals are undesirable as they cause difficulties in subsequent processing; they are abrasive to equipment; etc. If crystallization is incomplete an amorphous sugar "glass" is formed which also causes processing difficulties. In the present invention it is possible to substantially eliminate glass from the resulting crumb, which is not always the case with conventional operations.

Further objects and advantages will become apparent from the following description.

DESCRIPTION OF THE DRAWINGS

FIG. 1 is an elevational view, partially broken away, of an embodiment of the invention;

FIG. 2 is a section taken at line 2—2 of FIG. 1;

FIG. 3 is an enlarged view of the upper portion of the apparatus as seen in FIG. 1; and FIG. 4 is a section as viewed at line 4—4 of FIG. 3.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may latter disguise it by variations in form or additions or further improvements.

In the present invention there is a vertical evaporator, generally 10. The liquid feed stock is introduced into the bottom of this evaporator and by the time it gets to the top it is a hot, thick, concentrated material (4-5% moisture). A transfer means, generally 11, moves this concentrated material to a crystallizer, generally 12. In the crystallizer the material is kneaded (worked, pulled, etc.) and cooled. Upon discharge from the crystallizer it is a crystalline product in particulate form. If the particulate product is to be stored rather than to be used in the near future, it is dried down to about 1% moisture in a drier, generally 13. The particular form of drier is not important to the present invention. For the purposes of illustration it is a tunnel drier with the product being carried therethrough on a conveyor, generally 14.

Evaporator

During evaporation, the material being evaporated flows upwardly through an annular passage 16 which is defined by inner and outer concentric walls 17 and 18. This passage is relatively narrow in the radial direction, e.g., about 15.87 mm (⅝ of an inch). The inner wall has a steam jacket 19 and the outer wall has a steam jacket 20. Steam is introduced into the chamber defined by the inner steam jacket through a pipe 22 having an external connection 22a. The connection for the condensate return of both jackets is shown at 23. The steam chamber defined by the external jacket 20 has a steam connection 24.

There is a source of steam as represented at 26. The steam from that source is fed to a series of temperature controls as represented at 27. Dot-dash line 28 represents the steam supply to inner jacket connection 22a. Dot-dash line 29 represents the steam supply to outer jacket connection 24. The condensate return for both jackets is represented by dot-dash line 30.

The material passage 16 has a header (not shown) at the bottom thereof which communicates with an external connection 32. The feed stock material from a source 33 is fed into this connection 32 under pressure by a pump 34. This pump is a variable speed, positive displacement pump, thereby permiting control of the rate at which the material passes through the evaporator.

A vertical shaft 36 is mounted in suitable bearings and is rotated by a variable speed power drive 37. A typical rotational speed would be 80 rpm for a 13.02 cm (5.125 inch) diameter rotor, but this would obviously vary with the rotor diameter. Rotatably secured to the top of the shaft is a spider 38. A plurality of rods 39 are welded to this spider and also to a rotor 40 which extends down through material passage 16. Thus the rotor is supported and rotated by shaft 36. A plurality of scrapers 41, only a portion of which are shown, are secured to the rotor to scrape both the inner and outer walls 17 and 18 of the material passage.

The top of the material passage is enclosed by a housing 43. The interior of this housing is open to atmosphere through a connection 44. Some operators may desire to operate the evaporator under vacuum in which case the connection 44 is employed to connect to the vacuum source, not shown. The housing includes an annular horizontal wall or shelf 45 which terminates in an annular vertical wall 46. A steam jacket 47 is employed to provide a chamber for the heating of wall 45, although it does also heat the very top portion of wall 18. Similarly, a steam jacket 48 is employed to heat that part of wall 46 within which the material will come into contact. Jacket 47 has supply and condensate connections 49 and 50. Jacket 48 has supply and condensate connections 51 and 52. From temperature control 27 steam is supplied to connections 49 and 51, as indicated by dot-dash lines 54 and 55. The return piping for the condensate is indicated by dot-dash lines 56 and 57.

Transfer Means

Functionally, the heated walls 45 and 46 are a part of the transfer means because their function is to maintain the proper temperature of the condensed material for the purpose of facilitating its removal from the evaporator before crystallization commences. The material is discharged from the housing through an opening 60 in walls 45 and 46.

A tube 61 communicates with opening 60. A substantial portion of this tube is heated by steam jacket 48. A second tube 62 is concentric with the first and secured thereto. This second tube has a discharge opening 63. A third tube 64 is secured to tube 62 and communicates with opening 63. A steam jacket 65 surrounds most of tubes 62 and 64. This jacket has a steam connection 67 and a condensate connection 68. Connection 67 is piped to the temperature controls 27, as indicated by dot-dash line 69. The condensate connection is piped to the source of steam, as indicated by dot-dash line 70.

A plurality of paddles, only one of which is shown in the drawings, are used to move the condensed material from the housing 43 into opening 60. These paddles comprise a mounting member 72 to which a replaceable scraper blade 73 is attached, as by means of bolts 74. This scraper blade scrapes both walls 45 and 46. Mounting member 72 is secured to a rod 39, as by means of clips 75. Alternatives such as U-brackets bolted onto the mounting member could be employed. An elongated clip 76 is used at the bottom to give the proper angular position to the mounting member and scraper blade. In this respect, it will be noted that the spider 38 rotates in the direction indicated by arrow 77. The scraper will thus move the thick material away from the evaporator passage 16 and crowd it into opening 60 as the scraper passes that opening. As best seen in FIG. 4, tube 61 angles away from the housing in a direction to facilitate the flow of the material through opening 60 and down the tube.

It is desirable to get the condensed material out of the housing 43 as promptly as possible, not only from the standpoint of preventing further evaporation, but also it is ready to immediately start crystallizing and the operation will be impaired if that occurs substantially before it gets into the crystallizer. To this end, a substantial number of scrapers are employed. The exact number will vary with conditions. By using different rods 39 for the mounting of scrapers, the number and positioning of the scrapers can be varied as required.

A helical conveyor 80 is rotatably mounted in tubes 61 and 62. The upper end of this conveyor is as close as possible to the scraper blades 73. This conveyor is attached to a gear drive motor 81 and rotated so as to draw the condensed material down the tube to opening 63. From opening 63 the material flows down to the bottom of tube 64 and then descends by gravity to the crystallizer. This will occur both by reason of the pull of gravity on the material in tube 64 and also by the pressure that the helical conveyor 80 applies to the material in tube 62 which in turn applies pressure to the material in tube 64. The operation of the helical conveyor is better if it is coated with a slippery material such as Teflon.

Crystallizer

The crystallizer 12 comprises a stator 85 within which is a rotor 86. The stator comprises an annular wall made up of an upper solid part 87 and a lower wall part 88 having a jacket 89 thereabout. The jacket defines an annular coolant chamber having an input connection 91 and a discharge connection 92. As indicated by dot-dash lines 93 and 94, coolant is circulated through this chamber from a source of liquid coolant 95. This source could be tap water (e.g., 12.78° C.).

The rotor comprises a shaft 97 rotatably mounted in top and bottom bearings 98. Sprockets 99 are secured to the shaft and chains 100 connect these sprockets to a variable speed power drive 101 to rotate the shaft. The rotor has an outer wall which, in the illustrated embodiment, is formed by three sections, namely, a lower cylindrical section 103, a truncated conical middle section 104 and an upper cylindrical section 105. There is a coolant jacket 106 about the inside of the lower wall 103 to define a chamber for receiving the liquid refrigerant. A pipe 107 communicates between the upper part of this chamber and the interior of shaft 97. The shaft is divided by a wall 109. A pipe 110 extends through this wall and to a rotary joint or stuffing box 111 at the bottom of the shaft. There the pipe 110 communicates with a discharge connection 112 on the rotary joint. A pipe 113 communicates with the lower end of the coolant chamber and the interior of shaft 97 below wall 109. At the lower end of shaft 97, that part of the shaft surrounding pipe 110 communicates through the stuffing box 111 with an intake connection 114 on the stuffing box. As is indicated by dot-dash lines 115 and 116, the connections 112 and 114 on the stuffing box are connected to the refrigerant source 95. Thus the coolant enters the coolant chamber through pipe 113 and exits from the chamber through pipe 107.

The space between the rotor and stator forms an annular product passage 118. This passage is larger at the top than at the bottom. While in the illustrated embodiment, the change in area of the passage is defined by the truncated conical wall 104, other configurations could be employed, as for example: the rotor could be of truncated conical configuration throughout its total height; the rotor could be cylindrical and the stator could be an inverted truncated conical configuration; etc. Extending from the rotor into the material passage 118 are a plurality of rods 119. A plurality of rods 120 extend from the stator wall into the material passage. These rods serve as material engaging elements to knead the material coming into the crystallizer from the transfer unit 11. The stator rods are positioned 45° apart. The rotor rods 119 are positioned 15° apart. This staggering produces two effects, namely, not all of the stator and rotor rods come into mesh at the same time which would intermittently load the power drive, and there is less tendency of the material to fall through the material passage.

At the bottom of the material passage 118 a truncated conical gate 122 is bolted to the rotor. By loosening the bolts (not shown) the gate may be adjusted up and down with respect to the bottom of the stator wall, as indicated by arrows 123. This gate serves to control the flow from the bottom of the material passage 118, which in turn controls how high the material builds up in that passage. The best results have been obtained by having about the bottom one third of the passage filled with material, but this may vary with particular apparatus, material, etc.

Below the material passage 118 is a chute 125 having an external wall 126 thereabout. This wall has a discharge opening 127 for the release of the material. Cool air (e.g., 10° C.) is blown into the chamber defined by chute 125 and wall 126. This air is forced in by a blower 128 which obtains the air from a suitable source 129. This cool air flows through material passage 118 countercurrent to the material flow and aids in cooling the material. In some installations this air need only be ambient air without any additional cooling.

Method and Operation

While each manufacturer of milk chocolate will have his own views as to what exactly should be used as feed stock, what should be the degree of caramelization, etc., the following description is illustrative and those familiar with the art of milk chocolate manufacture will be aware, from this description, of the modifications that they can make to achieve their desired result. Relative proportions of ingredients for a chocolate crumb would be 51.71 kg. (114 pounds) of condensed sweet milk, 1.59 kg. (3.5 pounds) of added sugar (e.g., cane sugar, etc.) and 6.17 kg. (13.6 pounds) of dark chocolate liquor. If one were desiring to make white crumb, a representative feed stock would be 49.90 kg. (110 pounds) of condensed sweet milk and 1.81 kg. (4 pounds) of added sugar (cane, beet, etc.). Other flavoring ingredients, etc., may be employed in the feed stock as desired.

The evaporator temperature (i.e., the temperature within jackets 19 and 20) should be within the range of about 160° C. (320° F.) and about 176.67° C. (350° F.). Like the other factors, the exact temperature employed is more of an art than a science, but an appropriate temperature would be 168° C. (335° F.).

An ideal temperature for the condensed material exiting from the evaporator is 124.89° C. (255° F.) and the rate of feed of pump 34 is adjusted to give this result. To maintain this temperature and aid in extracting the condensed material (which is viscous and sticky) promptly from the evaporator hood, the temperature within jacket 47 and heating plate 45, is set at 129.44° C. (265° F.) and the stream temperature in jacket 46 is 124.89° C. (255° F.). The temperature within steam jacket 65 also would be 124.89° C. (255° F.). The operable range of temperatures for the material exiting from the evaporator is 121.1° – 126.67° C. (250° – 260° F.). Using another material temperature within this range, one would adjust the temperatures accordingly from that given above for steam jackets 47 and 48. An important feature of the invention is the ability to obtain the degree of caramelization and to adapt to particular formulas of feed stock, to meet the desires of the operator. This is done by adjusting the temperatures and the rate of flow of the material.

The condensed material exiting from the transfer unit 11 is deposited upon a plate 135 at the top of the crystallizer, but below the top rods 120. These top rods 120 are at each end of the plate. Thus, these rods prevent a glob of material from suddenly descending into the material passage of the crystallizer. Instead, small quantities are extracted with a shearing action as the moving rods 119 pass over the plate and below the top rods 120. In starting up, a small amount of crystalline material is placed on this shelf as "seed".

In the crystallizer, the material is pulled and worked much in the way that one would work taffy. This may be referred to as a kneading action. As this is being done, heat is extracted and the material crystallizes. The rotor 86 is rotated at a peripheral speed of about 96 meters per minute (320 ft./min.). It is important to cool the material rapidly in the crystallizer so as to obtain small sugar crystals. If the material is not cooled rapidly, there is a tendency for the formation of large sugar crystals. Sugar "glass" may also be formed.

The material exiting from the crystallizer will be in particles having small crystals, but with some agglomeration of the particles. The material has only a small amount of fines. In terms of desirable characteristics from the standpoint of using the material for the manufacture of milk chocolate products, it is equal to or better than the material produced by conventional processes in use today.

The material exiting from the crystallizer (i.e., out opening 127) has about 4–6% moisture. If that material is to be used in the near future in the further manufacture of chocolate products, it can be transferred to such other manufacturing operations without further processing. However, if it is to be stored for any length of time, the moisture content should be reduced to about 1%. Various forms of driers (e.g., 13) could be used for this purpose.

While the overall apparatus combination described herein is a highly desirable unit by itself, this is not to say that the components need necessarily be used together. For example, the evaporated material exiting from the transfer unit 11 could be crystallized in an apparatus other than the unit 12 described herein. For example, it could be kneaded in a melangeur or other type of heavy mixing equipment presently in use and then dried in trays in vacuum ovens in accordance with conventional processes. Similarly, other forms of evaporators, e.g., a multiple tube type evaporator, could be employed to produce the paste which is then crystallized in the crystallizer 12 described herein.

The use of a descending path of flow in the crystallizer has an advantage in the control of the degree of working of material as it crystallizes. Speed of rotation of the rotor and the adjustment of gate 122 are control factors in arriving at the desired result.

We claim:

1. A process of preparing a crystalline product from a liquid feed stock material comprising sugar, milk solids and a significant amount of moisture and utilizing a vertical evaporator having heated walls terminating at a top opening, said process comprising the steps of:

condensing said feed stock material to a readily crystallizable material by continuously introducing said feed stock material into the bottom of said evaporator and heating said material in said evaporator such that upon reaching said top opening it has a temperature of between about 121.1° C. and about 126.67° C. and a moisture content of between about 4% and 6%;

mechanically pushing said readily crystallizable material away from said top opening to a given location spaced from said evaporator; and at said given location kneading said material removed from the evaporator while it crystallizes.

2. A process as set forth in claim 1 including the steps of maintaining the material in the evaporator at atmospheric pressure and heating said evaporator to a temperature of between about 160° C. and about 176.67° C.

3. A process as set forth in claim 2 including the step of maintaining said condensed material at a temperature of at least 121.1° C. from the time it is removed from the evaporator to the time that the kneading commences.

4. A process as set forth in claim 3 including the steps of moving the condensed material along a descending path while it is being kneaded, and cooling the condensed material as it is moved along said path.

5. A process as set forth in claim 4, wherein said kneading is preformed by positioning a plurality of material engaging elements transversely in said path, and moving some of said elements with respect to the remainder of said elements in a direction transverse to said path.

6. A process as set forth in claim 1, wherein chocolate is added to said feed stock material before introduction into said evaporator.

7. A process of preparing a crystalline product from a liquid feed stock material comprising sugar, milk solids and a significant amount of moisture comprising the steps of:

continuously evaporating said feed stock material to produce a condensed material having a temperature of between 121.1° C and 126.67° C. and a moisture content of between about 4% and about 6%;

promptly moving said condensed material along a descending path;

which said material is in said path kneading said material by positioning a plurality of material engaging elements transversely in said path, and moving some of said elements with respect to the remainder of said elements in a direction transverse to said path until said material has crystallized; and cooling said material as it is being kneaded.

8. A process as set forth in claim 7, wherein chocolate is added to said feed stock material.

* * * * *

UNITED STATES PATENT AND TRADEMARK OFFICE
CERTIFICATE OF CORRECTION

PATENT NO. : 4,086,371
DATED : April 25, 1978
INVENTOR(S) : Bernard W. Minifie and Ted S. Czyzewski It is certified that error appears in the above–identified patent and that said Letters Patent are hereby corrected as shown below:

Column 2, line 52, "latter" should read --later--.
Column 3, line 56, --the-- should be inserted after "From".
Column 6, line 32, "stream" should read --steam--.
Column 8, line 38, "which" should read --while--.

Signed and Sealed this

Twelfth Day of September 1978

[SEAL]

Attest:

RUTH C. MASON
Attesting Officer

DONALD W. BANNER
Commissioner of Patents and Trademarks